United States Patent [19]

Burrill et al.

[11] 4,177,176

[45] Dec. 4, 1979

[54] TREATMENT OF FIBRES

[75] Inventors: Peter M. Burrill; Frank S. Rankin, both of S. Glamorgan, Wales

[73] Assignee: Dow Corning Limited, Barry, Wales

[21] Appl. No.: 684,201

[22] Filed: May 7, 1976

[30] Foreign Application Priority Data

May 17, 1975 [GB] United Kingdom ............... 21101/75

[51] Int. Cl.² ............................................. C08L 83/08
[52] U.S. Cl. .............................. 260/29.2 M; 428/447; 525/478
[58] Field of Search .................. 260/29.2 M, 28, 825; 428/447

[56] References Cited

U.S. PATENT DOCUMENTS

| 3,508,933 | 4/1970 | Yates | 260/28 |
|---|---|---|---|
| 3,524,900 | 8/1970 | Gibbon | 260/825 |
| 3,814,710 | 6/1974 | Duncan | 260/825 |
| 3,849,359 | 11/1974 | Nitzsche | 260/825 |
| 3,876,459 | 4/1975 | Burrill | 428/447 |
| 3,962,500 | 6/1976 | Smith | 428/447 |
| 3,983,265 | 9/1976 | Letoffe | 260/825 |

*Primary Examiner*—Paul R. Michl
*Attorney, Agent, or Firm*—Robert F. Fleming, Jr.

[57] ABSTRACT

Composition comprising (A) a polydiorganosiloxane having molecular weight of at least 2500 and terminal —OX groups in which X is hydrogen, lower alkyl or alkoxyalkyl, at least two of the substituents in the polydiorganosiloxane containing at least two amine groups, the remainder preferably being methyl radicals, and (B) an organosiloxane having at least 3 silicon-bonded hydrogen atoms. The compositions can be applied to keratinous fibres to render such fibres shrink resistant and are particularly suitable for application in the form of an aqueous emulsion.

8 Claims, No Drawings

TREATMENT OF FIBRES

This invention relates to a composition and process for the treatment of keratinous fibres.

It has long been known to treat wool and other keratinous fibres with various substances to reduce shrinkage and felting of the fibres during laundering. For example it has been proposed to reduce the shrinkage of wool by treatment with certain organosilicon compounds. In U.K. Pat. Nos. 594,901, 613,267 and 629,329 it is proposed to reduce the normal tendency of wool to shrinkage by treating the wool with certain alkyl or aryl silanes. In U.K. Pat. No. 746,307 there is disclosed a process for treating wool in which the wool is treated with a composition consisting of a diorganopolysiloxane, in which the organic groups are alkyl, phenyl and alkenyl, and a siloxane containing silicon-bonded hydrogen atoms. Although such processes confer a certain degree of shrink resistance to keratinous fibres this effect has not been durable to repeated laundering.

It has also been proposed in U.K. Pat. No. 1,396,509 to render keratinous fibres resistant to shrinkage by applying thereto certain amino-containing organopolysiloxanes. The treatment described in U.K. Pat. No. 1,396,509 is, however, best suited for application to keratinous fibres which have been chlorinated. Another method which has been proposed for rendering keratinous fibres shrink resistant comprises applying to the fibres a mixture of a silanol-terminated polydiorganosiloxane and amino-alkoxy silane. Such mixtures are more adapted for application in a solvent carrier. Although aqueous emulsions of the mixtures can be prepared it is necessary to use such emulsions without delay for the best results.

According to the present invention there is provided a composition which comprises (A) a polydiorganosiloxane having a molecular weight of at least 2500 and terminal —OX radicals wherein X represents a hydrogen atom or an alkyl or alkoxyalkyl radical having up to 15 carbon atoms, at least two of the silicon-bonded substituents present in said polydiorganosiloxane being monovalent radicals composed of carbon, hydrogen, nitrogen and, optionally, oxygen, which radicals contain at least two amine groups and are attached to silicon through a silicon to carbon linkage, and at least 50 percent of the total silicon-bonded substituents in said polydiorganosiloxane being methyl radicals, any remaining substituents being monovalent hydrocarbon radicals having from 2 to 20 inclusive carbon atoms, and (B) an organosiloxane having at least three silicon-bonded hydrogen atoms in the molecule and in which the organic radicals are alkyl radicals having less than 19 carbon atoms.

This invention also provides a process for treating keratinous fibres with a composition comprising (A) and (B) and further provides keratinous fibres whenever treated by the said process.

The polydiorganosiloxanes (A) employed in the compositions of this invention are linear or substantially linear siloxane polymers having a molecular weight of at least 2500 and —OX radicals attached to each terminal silicon atom, wherein X represents a hydrogen atom or an alkyl or alkoxyalkyl having up to 15 carbon atoms. Examples of the operative X radicals are methyl, ethyl, propyl and methoxyethyl. Preferably X represents the methyl or ethyl radicals. Up to 3—OX radicals may be attached to each terminal silicon atom, the preferred polydiorganosiloxanes being those having one —OX radical attached to each terminal silicon atom. The polydiorganosiloxanes (A) can be prepared by known techniques, for example by the equilibration of the appropriate cyclic siloxanes. A more preferred method of preparing the polydiorganosiloxanes (A) comprises reacting a silanolterminated polydiorganosiloxane free of the specified amino-containing substituents with a silane $CH_3(XO)_2SiZ$ in which X is as hereinabove defined and Z represents a monovalent radical composed of carbon, hydrogen, nitrogen and, optionally, oxygen, which radical contains at least two amino groups and is attached to silicon through a carbon to silicon linkage.

At least two of the silicon-bonded substituents in (A) are the specified monovalent radicals composed of carbon, hydrogen, nitrogen and, optionally, oxygen and containing at least two amino groups. Preferably said amino-containing substituents have less than 21 carbon atoms and are joined to the silicon atom through a bridge of at least 3 carbon atoms. Any oxygen may be present in ether and/or carbonyl groups. Examples of the operative amino-containing substituents are
—$(CH_2)_3NHCH_2CH_2NH_2$, —$(CH_2)_4NHCH_2CH_2NH_2$,
—$CH_2CH(CH_3)CH_2NHCH_2CH_2NH_2$,
—$(CH_2)_3NHCH_2CH_2NHCH_2CH_2NH_2$,

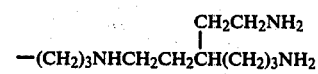

and —$(CH_2)_3NH(CH_2)_2NHCH_2CH_2COOCH_3$, the first three exemplified groups being preferred.

At least 50% of the silicon-bonded organic substituents in the polydiorganosiloxane are methyl radicals, any other radicals present in addition to said methyl radicals and the specified amino-containing substituents being monovalent hydrocarbon radicals having from 2 to 20 carbon atoms. Examples of such monovalent hydrocarbon radicals are ethyl, propyl, 2,4,4-trimethylpentyl, cyclohexyl, vinyl and phenyl. Preferably the organic radicals present in the polydiorganosiloxane in addition to the amino-containing radicals are substantially all methyl radicals.

The organosiloxanes which comprise component (B) of the compositions of this invention are, in general, well-known materials. They may comprise any one or more organosiloxanes having at least three silicon-bonded hydrogen atoms in the molecule. They are preferably linear siloxane polymers but may be cyclic or branched. The organic substituents present in the organosiloxane are preferably methyl radicals but other alkyl radicals having less than 19 carbon atoms, e.g. ethyl or 2,4,4-trimethylpentyl may also be present. The organosiloxanes (B) can be for example copolymers of dimethylbutylsiloxane units with methylhydrogensiloxane units, copolymers of dimethylhydrogensiloxane units, ethylhydrogensiloxane units and dimethylsiloxane units and copolymers of trimethylsiloxane units, dimethylsiloxane units and methylhydrogensiloxane units. Preferred as the organosiloxanes (B) are copolymers of trimethylsiloxy units and methylhydrogensiloxane units, with or without copolymeric dimethylsiloxane units.

The relative proportions of (A) and (B) employed in forming the compositions of this invention are not narrowly critical and will depend, at least partially, on the nature of (A) and (B). Generally (B) is employed in a proportion of from about 2 to 75%, preferably from 4 to 25%, by weight based on the weight of (A) but higher or lower proportions may be more appropriate in certain cases.

The compositions of this invention can be applied to keratinous fibres to render such fibres resistant to shrinkage on laundering and/or to impart other desirable properties e.g. improved handle (softness) and resistance to pilling. They are preferably applied to the keratinous fibres as a solution or dispersion in a liquid diluent. The compositions are particularly suitable for application in the form of an aqueous emulsion but may also be applied, if desired, as a solution in an organic solvent, for example white spirit, xylene or perchloroethylene. The compositions of this invention can be prepared by merely mixing (A) and (B). Most conveniently (A) and (B) are prepared separately as solvent solutions or aqueous emulsions and the two solutions or emulsions mixed together to provide the treating composition. For maximum bath life (A) and (B) are preferably not mixed until the composition is required for use. Application of the composition to the fibres can be carried out employing any suitable technique, for example by padding or spraying.

Following application of the composition, the treated fibres are dried and the composition cured. Drying and curing may be carried out by merely exposing the treated fibres to normal atomspheric temperatures e.g. from 15 to 30° C. If desired, however, this step may be expedited by the use of elevated temperatures, e.g. from 60 to 140° C. The curing step may also be expedited by including in the composition a siloxane curing catalyst, for example a metal carboxylate such as dibutyltin dilaurate, dibutyltin dioctoate and zinc octoate.

The proportion of composition applied to the fibres can be varied within fairly wide limits depending on the degree of shrink resistance required and on the type of fibre. We generally prefer to apply the composition at a level which results in an add-on after drying and curing of from about 2% to 6% of the total weight of (A) and (B) based on the weight of the fibres. However, as little as 0.5% add-on can result in a useful improvement in shrink resistance especially with certain blends of fibres, for example wool and synthetic fibres. More than 6% by weight of the composition may be applied but such levels are not normally economically attractive.

The process of this invention can be employed to impart shrink resistance and/or other desirable properties to a variety of keratinous fibres, for example lambs' wool, botany wool, mohair, cashmere and alpaca wool. The fibres may be treated in any form, for example as yarns, knitted or woven fabrics or made up garments.

The following examples, in which the parts are expressed by weight, illustrate the invention.

EXAMPLE 1.

A copolymer was prepared by heating together $CH_3(CH_3O)_2Si(CH_2)_3NHCH_2CH_2NH_2$ (7.5 parts) and a polydimethylsiloxane (1000 parts) having a hydroxyl radical attached to each terminal silicon atom and a viscosity of approximately 3000 cS at 25° C. The heating step was performed under nitrogen for two hours at 150° C., the reaction mixture being efficiently stirred. The resulting copolymer product was a clear liquid having a viscosity of approximately 7000 cS at 25° C.

The copolymer prepared as described above (33.3 parts) was added gradually to a mixture of non-ionic em emulsifier (Tergitol TMN) (1.7 parts) and water (8.3 parts). This mixture was stirred for one hour, passed through a colloid mill and then diluted with water (56.6 parts) to yield an aqueous emulsion (Emulsion A).

Employing the same procedure and proportions an aqueous emulsion of a trimethylsiloxy end-stopped polymethylhydrogensiloxane (viscosity 30 cS at 25° C.) was prepared (Emulsion B).

Emulsion A (95 parts) and Emulsion B (5 parts) were mixed, diluted with water and applied by padding to solventscoured, unchlorinated, knitted, botany wool fabric. The dilution and padding conditions were adjusted so that the add on of siloxane by the fabric was 3% by weight. The treated wool samples were then dried at 80° C. for about 10 minutes and stored for 3 days under normal atmospheric conditions (22° C., 50% RH).

The resistance of the treated samples to shrinkage was then measured according to the method of the International Wool Secretariat, Specification WSS 128, Test Method 185. Briefly stated said test method involves subjecting samples of the fabric to laundering for periods of 1 hour and 3 hours in an International Cubex machine. From measurements of the dimensions of the fabric prior to and following laundering the percentage area felting shrinkage (AFS) can be calculated. After the 1 hour wash period the AFS was 0.5%. After the 3 hour wash the AFS was 2.6%.

EXAMPLE 2.

The copolymer (95 parts) prepared in Example 1 and a trimethylsiloxy end-stopped polymethylhydrogensiloxane having a viscosity of 30 cS at 25° C. (5 parts) were dissolved in perchloroethylene and the solution applied by padding to samples of solvent-scoured, unchlorinated, knitted botany wool. The proportion of perchloroethylene and the padding conditions were adjusted so that the add-on of siloxane was 3% based on the weight of the fabric.

The treated samples were then dried at 80° C. for about 5 minutes and stored under normal atmospheric conditions for 3 days. When the shrink resistance of the samples was measured according to the test described in Example 1 the AFS values obtained were 1.1% after the 1 hour wash and 1.6% after the 3 hour wash.

EXAMPLE 3

The procedures of Examples 1 and 2 were repeated except that the polymethyldhydrogensiloxane was replaced by an equal weight of a copolymer of formula
(i) $Me_3SiO(SiMe_2O)_{15}(SiMeHO)_{15}SiMe_3$, or,
(ii) $Me_3SiO(SiMe_2O)_3(SiMeHO)_3SiMe_3$
Me representing the methyl radical.

When the area felting shrinkage of the samples was measured according to the test described in Example 1 the following values were obtained.

| | AFS (%) | | | |
| | Solvent | | Aqueous Emulsion | |
| | 1 hour | 3 hours | 1 hour | 3 hours |
| --- | --- | --- | --- | --- |
| (i) | 3.2 | 9.0 | 2.0 | 5.1 |
| (ii) | 4.9 | 6.3 | −2.3 | 2.3 |

That which is claimed is:

1. A composition consisting of (A) a polydiorganosiloxane having a molecular weight of at least 2500 and terminal —OX radicals wherein X represents a hydrogen atom or an alkyl or alkoxyalkyl radical having up to 15 carbon atoms, at least two of the silicon-bonded substituents present in said polydiorganosiloxane being monovalent radicals composed of carbon, hydrogen, nitrogen and, optionally, oxygen, which radicals contain at least two amine groups and are attached to silicon through a silicon to carbon linkage, and at least 50 percent of the total substituents in said polydiorganosiloxane being methyl, radicals, any remaining substituents being monovalent hydrocarbon radicals having from 2 to 20 inclusive carbon atoms, and (B) an organosiloxane having at least three silicon-bonded hydrogen atoms in the molecule and in which the organic radicals are alkyl radicals having less than 19 carbon atoms.

2. A composition as claimed in claim 1 wherein the polydiorganosiloxane (A) has been prepared by the reaction of a silanol terminated polydiorganosiloxane and a silane of the general formula $CH_3(XO)_2SiZ$ wherein X represents an alkyl or alkoxyalkyl radical having up to 15 carbon atoms and Z represents a monovalent radical composed of carbon, hydrogen, nitrogen and, optionally, oxygen, which radical contains at least two amine groups and is attached to silicon through a silicon to carbon linkage.

3. A composition as claimed in claim 1 wherein X represents the methyl radical or the ethyl radical.

4. A composition as claimed in claim 1 wherein the amino-containing radicals present in (A) are selected from $-(CH_2)_3NHCH_2CH_2NH_2$, $-(CH_2)_4NHCH_2CH_2NH_2$ and $-CH_2CH(CH_3)CH_2NHCH_2CH_2NH_2$.

5. A composition as claimed in claim 1 wherein (B) is employed in a proportion of from 4 to 25% by weight based on the weight of (A).

6. A composition as claimed in claim 1 in the form of an aqueous emulsion.

7. A process for the treatment of keratinous fibres which comprises applying to said keratinous fibres a composition as claimed in claim 1 and curing the applied composition.

8. A process as claimed in claim 7 wherein the composition is applied in the form of an aqueous emulsion.

* * * * *